United States Patent Office
3,804,722
Patented Apr. 16, 1974

3,804,722
EXTRACTIVE DISTILLATION OF PYRIDINE-WATER AZEOTROPE WITH A BISPHENOL
Earl D. Oliver, Los Altos, Calif., assignor to Montecatini Edison S.p.A., Milan, Italy
Filed Sept. 11, 1970, Ser. No. 71,333
Int. Cl. B01d 3/40; C07d 3/16, 3/20
U.S. Cl. 203—14                    4 Claims

ABSTRACT OF THE DISCLOSURE

A pyridine-water azeotropic mixture is resolved by extractively distilling same with bisphenol compounds or distilling same with caustic.

---

This invention relates to the resolution of pyridine-water azeotropic mixtures.

The azeotropic mixture of pyridine and water gives a liquid and vapor composition curve showing a minimum boiling point of 92.6° C. The constant boiling mixture contains 57% by weight by pyridine and 43% by weight of water. It has been known in the prior art to separate pyridine from the above azeotrope by treatment with soda lye or caustic soda to dehydrate the mixture. In carrying out these known processes relatively large quantities of lye or caustic soda are required because the soda lye can can only be diluted from about 45% to 15–20%, if it is to still have sufficient dehydrating effect.

It is further known from the prior art that pyridine can be removed from a water azeotrope by washing same with benzol. Furthermore, a water-pyridine mixture which contains more water than the azeotropic composition can be separated by subjecting same to distillation such that pure water can be obtained from the distillation column bottoms. If a third constituent such as soda lye is added, separation of the water is facilitated. Similarly, the addition of benzol improves the separation of aqueous pyridine by distillation into pyridine and a mixture of water and pyridine. Such processes are described in U.S. Pat. No. 2,717,232.

Furthermore, it is known to separate pyridine-water azeotropic mixtures by the addition of so-called azeotrope breakers such as oils as described in U.S. Pat. No. 2,178,506. Pyridine-water azeotropic mixtures are frequently produced in various industrial processes and the methods of the instant invention are therefore directed to resolving all such azeotropes. However, the processes of the instant invention are more specifically directed to the resolution of azeotropic mixtures produced in the production of polycarbonates by the phosgenation of bisphenol compounds.

Accordingly, it is an object of the instant invention to provide a new and improved process for the separation of pyridine-water azeotropic mixtures thereby producing a stream of relatively pure pyridine.

It is a further object of the instant invention to resolve the pyridine-water azeotropic mixtures produced as a by-product in the production of polycarbonates form the phosgenation of bisphenol compounds. Furthermore, it is an object to resolve said azeotrope produced by said polycarbonate production without the addition of extraneous azeotrope breakers which would require separation therefrom.

These and other objects will be more fully appreciated from a study of the specification, the drawings and the appended claims.

According to the instant invention, a pyridine-water azeotropic mixture is resolved by extractively distilling same with bisphenol compounds.

According to another aspect of the instant invention, pyridine-water azeotrope mixtures are resolved by distilling same with caustic.

According to yet another aspect of the instant invention, bisphenol compounds and pyridine are phosgenated, the resulting product mixture is subjected to aqueous washing thereby producing a stream of polycarbonates and an aqueous solution, said aqueous solution is distilled thereby producing streams of water and a water-pyridine azeotrope stream, said azeotrope is extractively distilled with bisphenol thereby producing an overhead water stream and a bottoms stream of bisphenol plus pyridine which is recycled to the aforementioned phosgenation step.

According to yet another aspect of the instant invention, bisphenol compounds and pyridine are phosgenated thereby producing a product mixture which is subjected to aqueous washing thereby producing separate streams of polycarbonates and an aqueous solution containing pyridine and water which is subsequently subjected to distillation with caustic thereby producing an overhead stream of pyridine and a bottoms stream of caustic, said overhead pyridine stream being recycled to the aforementioned phosgenation step.

These and other aspects of the instant invention will be apparent to those skilled in the art from a consideration of the following specification and claims and appended drawings wherein:

DESCRIPTION OF PREFERRED EMBODIMENTS

It is recognized that the attempted distillation of pyridine overhead from a pyridine-water azeotrope is unnatural since pyridine boils at a higher temperature than does water. It has now been found that the addition of bisphenol to pyridine in said azeotropic mixture will increase the relative volatility of the water since pyridine is basic and bisphenol is acidic. Hence, bisphenol is used in the instant invention as extractive distillation solvent so that the water can be distilled overhead from said azeotropic mixture. The bottoms product containing bisphenol and pyridine may be adjusted in composition and further purified as necessary. Such further purification steps encompass the separation of some of the bisphenol, preferably by distillation, for return to the extractive distillation column, because the amount of bisphenol needed in the extractive distillation column is more than the amount needed in the phosgenation step.

Bisphenol is added to said azeotropic mixture in amounts equal to from $\frac{1}{10}$ to 20, more particularly 1 to 4 times the amount of pyridine in said azeotropic mixture where the pyridine is present in said azeotropic mixture in an amount equal to about 57% and said water is present in an amount equal to about 43% by weight and also in those cases in which said pyridine is present in an amount greater or less than the azeotropic amount. All these ratios of bisphenol to pyridine are on a molar basis. Other ratios may be used, but will be either ineffective or uneconomical.

Bisphenol compounds within the scope of the instant invention are bis-(hydroxyaryl) derivatives, more particularly, bis-(hydroxyaryl) alkanes. Particularly preferred is bisphenol A, that is, 2,2-bis(4-hydroxyphenyl) propane. Other specific bisphenol compounds which may be employed in the instant invention are other dihydroxydiaryl alkanes and dihydroxylbenzenes, including substituted products thereof.

It should be apparent to those skilled in the art that other materials in the pyridine-water azeotrope which can be present are solvents used for the polymer, for example, methylene chloride, and catalysts, inhibitors, and other additives.

In a preferred embodiment of the instant invention, the azeotrope is introduced in the middle portion of the distillation column, and bisphenol is introduced into the top portion of said column.

For an azeotropic mixture containing about 57% pyridine and wherein the bisphenol to pyridine mole ratio is from 1 to 4, the top temperature of said extractive distillation column is maintained at from 96 to 100° C. and the bottom temperature is maintained at from 135 to 165° C., if atmospheric pressure is used. It should of course be obvious to those skilled in the art that other equivalent modes of operating said distillation column are within the scope of the instant invention.

Figure 1:
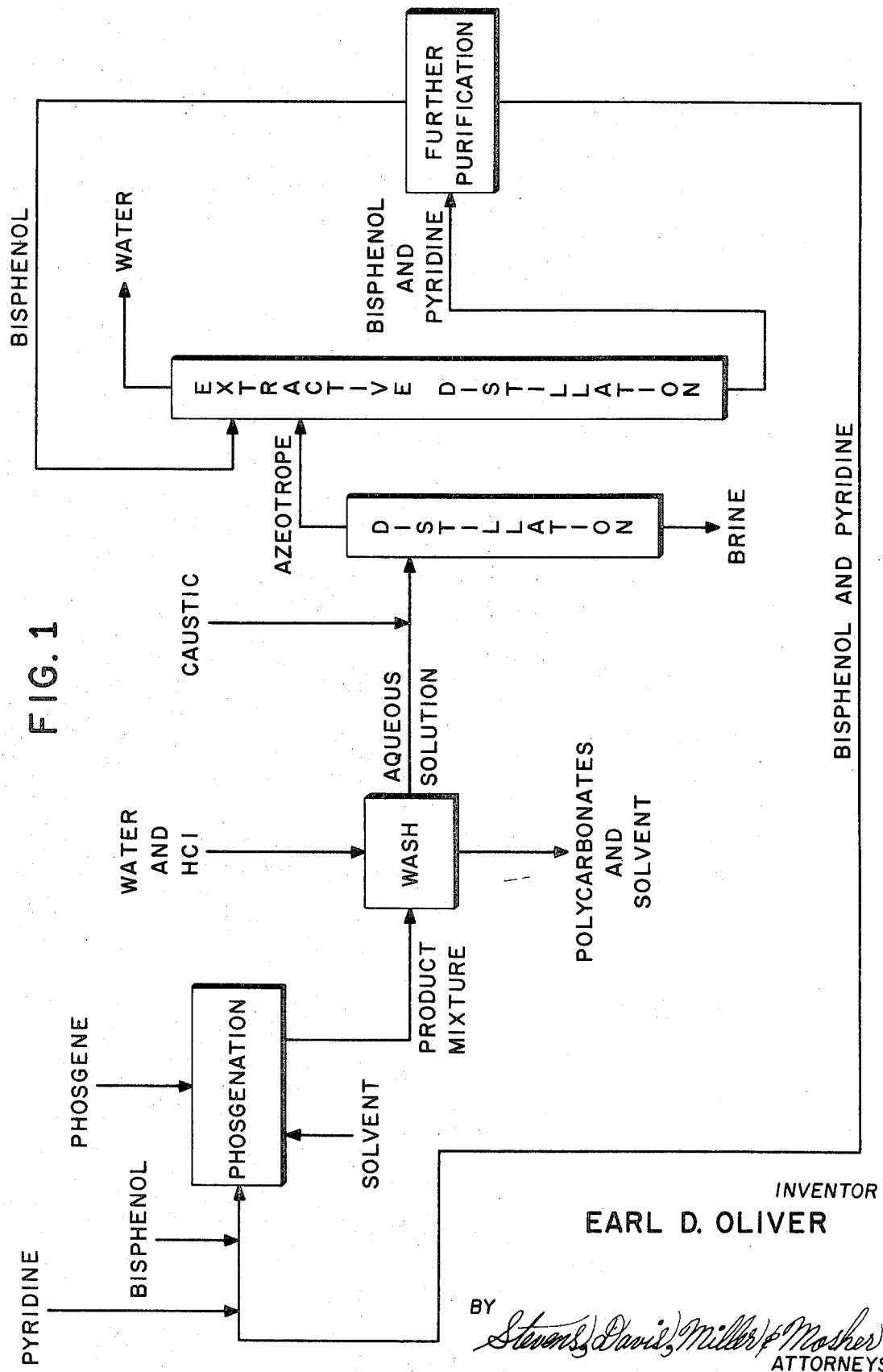
FIG. 1 is a schematic representation of the separation of a pyridine-water azeotropic mixture produced as a by-product of the phosgenation of bisphenol compounds wherein said azeotrope is extractively distilled with bisphenol compounds.

This aspect of the instant invention is particularly advantageous in the separation of pyridine-water azeotropic mixtures produced as a by-product in the production of polycarbonates by the phosgenation of bisphenol compounds. Referring to FIG. 1, bisphenol is first reacted with phosgene in the presence of an acid acceptor, more particularly, pyridine. Said reaction is normally carried at a temperature of from the freezing point to the boiling point of the mixture, preferably below 40° C. The mole ratio of bisphenol to phosgene is from 0.65 to 1.0, and the mole ratio of pyridine to bisphenol is from 1.0 to 1.2 in said reaction. Pyridine reacts with HCl formed in the reaction and is normally present in excess of said HCl formed.

The resultant product mixture removed from the phosgenation reactor is subjected to one or more subsequent washing stages, preferably with water. Said water contains HCl, 1.0 to 1.2 mole per mole unconverted pyridine, to convert said pyridine to the hydrochloride to make washing more effective. A purified stream of polycarbonate is obtained from the last of said washing steps and as a by-product there is produced an aqueous solution which after neutralization contains pyridine, that is, from 1 to 20% pyridine and from 99 to 80% water, more particularly, from 95 to 90% water all by weight. Since this solution normally contains an amount of water greater than its azeotropic composition, said aqueous solution is first subjected to a normal distillation step wherein water is taken from the bottom of the column and the azeotropic mixture is taken overhead.

Since the pyridine is employed in the aforementioned phosgenation step as an acid acceptor, it is normally in the form of an acid addition salt in said aqueous solution, for example, pyridine hydrochloride. Therefore, subsequent to or concurrently with said distillation step, caustic is added to neutralize said pyridine acid addition salt, for example, the chemical equivalent of caustic is added based on the amount of said pyridine hydrochloride present in said aqueous solution. Other acid addition salts within the scope of the instant invention are hydrofluoride and hydrobromide.

The caustics which are within the scope of the instant invention are sodium hydroxide, lithium hydroxide, potassium hydroxide, cesium hydroxide, and rubidium hydroxide, particularly sodium hydroxide because of its relatively low cost and availability.

The azeotropic mixture is next introduced into an extractive distillation column preferably in the middle portion thereof. A bisphenol compound, preferably bisphenol A, is introduced into the upper portion of said column. It should be obvious to those skilled in the art that said azeotropic compound can be mixed with bisphenol compound prior to the introduction thereof into said distillation column.

Water is removed overhead and a mixture of bisphenol and pyridine is removed from the bottom of said distillation column which, if required, is subject to further purification as described above before it is recycled to said phosgenation step. Before the introduction of said bisphenol pyridine stream into said phosgenation step, bisphenol and pyridine are added thereto in an amount equal to the attrition and reaction losses within said process.

In another aspect of the instant invention, pyridine-water azeotrope mixtures can be separated by the addition of an azeotropic breaker, namely, caustic. Caustics which can be employed in the scope of the instant invention are sodium hydroxide, lithium hydroxide, potassium hydroxide, cesium hydroxide, and rubidium hydroxide, particularly, sodium hydroxide because of the relatively low cost and availability. As previously indicated, the addition of caustic as an azeotrope breaker by its dehydrating effect has been known in the prior art; however, it has now been found that a particular integration of this method with the production of polycarbonates eliminates the need for equipment to re-concentrate the caustic used (or the more expensive expedient of discarding the caustic).

The amount of water that goes overhead with the pyridine is dependent on the concentration of water in the caustic, which is advantageously charged to the top of the column in order to take full advantage of countercurrent processing and to minimize the amount of water going overhead. Theoretically pure caustic might be used, completely eliminating water from the overhead. However, this method would create severe handling and material problems. It is advantageous to use caustic of the highest readily available commercial concentration in aqueous solution, currently about 73% NaOH by weight. However, any concentration may be used so long as the water vapor pressure is less from the caustic solution than from the water-pyridine azeotrope, that is, the concentration is more than about 7 g. NaOH/100 g. H$_2$O. Under these conditions, the overhead product will be richer in pyridine than the azeotropic concentration. However, it will contain water corresponding to the vapor pressure of water from the caustic solution at the column top temperature. Pure pyridine can then be obtained from said overhead product as a bottom product by distilling the azeotrope overhead in a separate column. This new azeotrope can be advantageously returned as feed to the column previously described which breaks the azeotrope by means of caustic. Under these conditions, essentially all the water that enters this column in the caustic and in the azeotrope leaves with the caustic from the bottom of the column. Hence, the azeotrope breaking column will operate with top temperatures from about 95 to 115° C., with about 111° C. resutling from preferred operation, and a bottom temperature coresponding to the concentration and pressure, as may be found from available data, for example, Perry, "Chemical Engineers' Handbook," fourth ed., McGraw-Hill, N.Y., 1963, pp. 3–67.

As mentioned above, other methods of operating extractive distillation columns known in the art can also be employed. It is to be understood that the distillation in both these methods are not limited to single column separations, but include multi-column and multi-step processes, as, for example, those discussed by S. Ohe, Japan Chemical Quarterly, IV–II, pp. 20–24 (1968).

It should be clear from the above that this aspect of the instant invention can be employed to resolve pyridine-water azeotropic mixtures regardless of the source thereof; however, it has been found that this aspect of the present invention is particularly adapted for separating the pyridine-water azeotrope produced as a by-product in the production of polycarbonates by the phosgenation of bisphenol compounds.

For one of the novel features of this invention, namely, the integration of the azeotrope separation with recovery of pyridine from pyridine hydrochloride, particularly from the manufacture of polycarbonates, it is advantageous to add NaOH in an amount chemically equivalent to said pyridine hydrochloride plus excess hydrochloric acid used in the washing step. The caustic solution leaving the bottom of the azeotrope breaking column can therefore be used to neutralize the pyridine hydrochloride solution so that the pyridine azeotrope can be distilled from the resulting salt solution.

Figure 2:
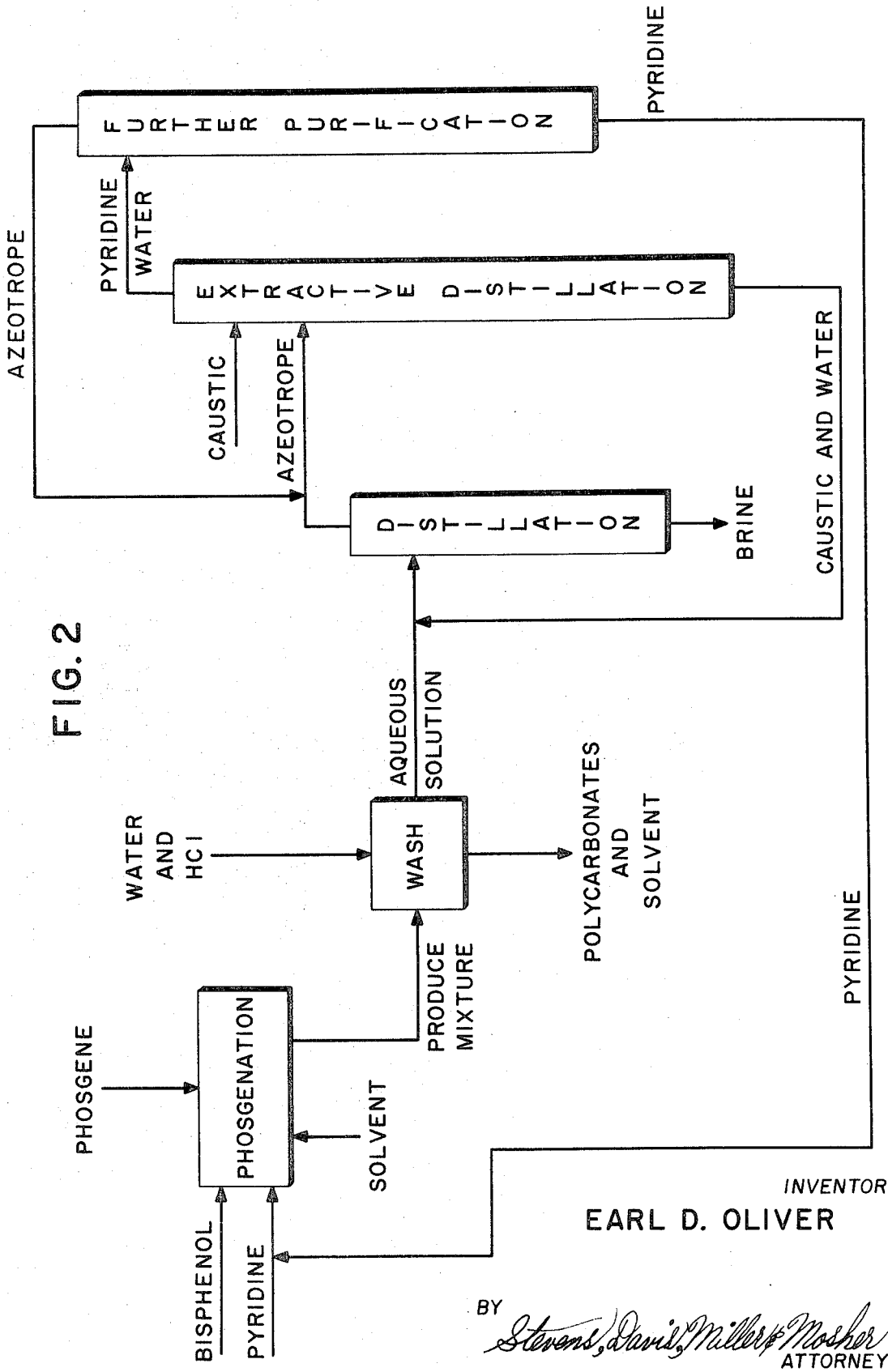
FIG. 2 is a schematic representation of the separation of a pyridine-water azeotropic mixture produced as a by-product of the phosgenation of bisphenol compounds wherein said azeotropic mixture is separated by distillation with caustic.

Referring to FIG. 2, in the production of polycarbonates as described above, according to this aspect of the instant invention, said aqueous solution is introduced into a distillation column with chemically equivalent or more caustic and distilled until an azeotropic mixture is taken overhead and water plus salt is removed from column bottoms. Said azeotropic mixture is next introduced into an extractive distillation column, preferably in the middle section thereof and caustic is introduced into said extractive distillation column in the top section thereof. It is of course obvious to those skilled in the art that said caustic and said azeotropic mixture can be mixed prior to or subsequent to the addition thereof to said distillation column. The amount of caustic and operating conditions for said distillation column have been described above. The caustic and water are removed from the bottom of said column and pyridine is removed overhead. If necessary, the pyridine can be subjected to further purification steps prior to introduction into the phosgenation step described above encompassing the removal of water and other impurities such as solvents and additives.

The present invention provides two new methods for recovery of the pyridine. In the first, it is recognized that distillation of pyridine overhead is unnatural, since it boils higher than water. Pyridine is basic and bisphenol is acidic in character, and both are organic compounds. Therefore, bisphenol will increase the volatility of water relative to pyridine. Hence, the bisphenol used in the process is used as an extractive distillation solvent, and the water is distilled overhead. The bottom product may be adjusted in composition and purified if necessary and charged to the phosgenation step of the process. In this way the separation of the azeotrope breaker is made unnecessary, which in itself is a significant improvement over prior practice.

In the second method, pyridine is distilled overhead as in prior practice, but a particularly advantageous azeotrope breaker is used, namely, caustic. The caustic for economy is preferably NaOH. In a sufficiently concentrated solution, water is less volatile than pyridine. The particular advantage of caustic is that it can be used directly in the recovery process to neutralize the pyridine hydrochloride, thus making separation of the azeotrope breaker (as used in prior practice) unnecessary.

The instant invention will be more fully appreciated by reference to the following specific examples which of course are not to be considered as limiting the scope of the instant invention.

Example I

An azeotrope is charged to the middle portion of an extractive distillation column with 30 theoretical plates. When 96.51 lb. mol/hr. of bisphenol A is charged to the top of said column, the bisphenol-free material balance is as follows:

| | Rates, lbs. mol/hrs. | | |
|---|---|---|---|
| | Charge | Overhead product | Bottom product |
| Pyridine | 32.17 | 0.03 | 32.14 |
| Water | 106.51 | 106.49 | 0.02 |

Part of the bisphenol is removed from the bottom product so that 10.16 lb. mol/hr. remains with the pyridine as charge to phosgenation. The bisphenol so removed is recycled to the top of the extractive distillation column.

Example II

An azeotrope containing 2,544 lb./hr. of pyridine and 1,919 lb./hr. water is charged to the middle section of an extractive distillation column. In addition, an azeotrope derived from the column overhead product containing 1,026 lb./hr. of pyridine and 774 lb./hr. water is also charged in the middle section of said column. At the top of the column, a solution containing 1,360 lb./hr. NaOH and 503 lb./hr. water is charged. The bottom of the column is reboiled to produce vapors. The top product contains 3,570 lb./hr. pyridine and 774 lb./hr. water. The bottom product contains 1,360 lb./hr. NaOH and 2,422 lb./hr. water. The top temperature is 240° F. at 2 p.s.i.g., and the bottom temperature is 270° F. The bottom product is used to neutralize pyridine hydrochloride and excess hydrochloric acid in a stream derived by washing a polycarbonate solution. The resulting neutralized solution is distilled to give the azeotrope which is the original charge to the extractive distillation column. The dry pyridine derived from distilling the extractive distillation column overhead product is re-used in the phosgenation reaction producing polycarbonates.

What I claim as my invention is:

1. A process for separating a pyridine-water azeotrope mixture comprising
   extractively distilling said azeotrope and a bisphenol compound which will increase the relative volatility of the water and is a bis(hydroxyaryl)alkane,
   removing water as an overhead product and
   removing pyridine and said bisphenol compound as a bottoms product.

2. A process according to claim 1 wherein said pyridine is present in an amount equal to about 57% by weight; water is present in an amount equal to about 43%; and said bisphenol compound is added in an amount equal to from 1/10 to 20 times the amount of pyridine on a molar basis.

3. The process of claim 1 wherein said bis(hydroxylaryl)alkane is 2,2-bis(4-hydroxyphenyl)propane.

4. The process of claim 2 wherein said bisphenol compound is added to said azeotrope in an amount of from 1 to 4 times the amount of pyridine on a molar basis.

References Cited
UNITED STATES PATENTS

| 2,058,435 | 10/1936 | Fisher | 203—14 |
| 1,290,124 | 1/1919 | Downs | 260—290 A |
| 2,717,232 | 9/1955 | Geller et al. | 203—14 |
| 2,981,680 | 4/1961 | Binning | 203—14 |

WILBUR L. BASCOMB, JR., Primary Examiner

U.S. Cl. X.R.

203—65